July 23, 1968 | JO ANN S. HOWARD | 3,394,233

TELEPHONE DIAL INSERT

Filed July 19, 1966

INVENTOR
JOANN S. HOWARD
BY Huebner & Worrel
ATTORNEYS.

United States Patent Office 3,394,233

Patented July 23, 1968

3,394,233

TELEPHONE DIAL INSERT

Jo Ann S. Howard, Inglewood, Calif., assignor to Franklin S. Briles, Rolling Hills, Calif.

Filed July 19, 1966, Ser. No. 566,264
10 Claims. (Cl. 179—90)

The present invention relates to telephone dials, and it relates more particularly to a novel rotatable insert adapted to be mounted in each of the finger holes of a telephone dial to provide protection for the fingernail and finger and to facilitate dialing.

There are a number of different types of telephone dials employed in modern telephones, and each of these embodies a generally rigid dialing wheel having a flat annular rim portion with apertures therethrough to provide the finger holes. With this construction, when the tip of a finger is inserted into one of the finger holes, and the finger is moved through an arc to dial a number, the portion of the dial which defines that finger hole will rotate through part of a revolution according to the extent of the arc, but at the same time the dialing finger will not appreciably rotate. This results in a substantial sliding friction between the surface defining the finger hole and the finger tip during the dialing of each of the succession of numbers for placing a call, which is objectionable for a number of reasons. For one thing, people who make extensive use of dial telephones find that this friction tends to wear down the fingernail of the dialing finger, usually the right index finger if the person is right-handed, preventing the fingernail from being kept properly manicured, and it tends to irriate the skin and form callouses thereon. This dialing friction which occurs with use of the conventional telephone dial actually makes the dialing operation more difficult, and even uncomfortable to many people. To minimize the discomfort, the tendency is to only place the tip of the finger lightly in the dial hole, and this frequently results in the finger slipping out of the hole, thereby requiring the entire number to be re-dialed.

Prior attempts have been made to provide rotating liner members for the dial finger holes. However, telephones currently in use have dials that are made in several different thicknesses which heretofore has required several different sizes of the liner members in order to accommodate the various dial thicknesses. It is desirable to rotatably position the liner members in the respective finger holes by providing radially outwardly directed upper and lower annular flanges on the liner members which are spaced apart so that the upper flange will overlap the upper surface of the dial and the lower flange will extend under the lower surface of the dial, with sufficient clearance for freedom of rotation but with the upper and lower flanges sufficiently closely spaced for secure positioning of the liner members. Prior art finger hole liner members having flanges spaced properly for a relatively thin dial could not be operatively mounted in a relatively thick dial; and conversely, liner members having the flanges spaced sufficiently far apart for a relatively thick dial of conventional manufacture had the flanges spaced too far apart for satisfactory operation in a relatively thin dial.

Accordingly, it is an object of the present invention to provide a novel telephone dial insert ring adapted for rotatable mounting in a telephone dial finger hole, wherein the ring is retained in its operative position by means of an upper flange which overlaps the upper surface of the dial and a lower flange which underlies the lower surface of the dial, and wherein one of the flanges is axially adjustable with respect to the other flange to vary the spacing between the flanges so as to adapt the ring for rotatable mounting in telephone dials of several different thicknesses.

A further object of the invention is to provide a dial insert ring of the character described wherein one of the positioning flanges is generally frusto-conical in shape and is connected to the body of the ring by a flexible hinge web, the said flange being movable in an overcenter action between a downwardly flaring position and an upwardly flaring position for adjustment of the spacing between the flanges.

Further objects and advantages of the present invention will appear during the course of the following part of the specification, wherein the details of construction and mode of operation of a presently preferred embodiment are described with reference to the accompanying drawings, in which.

Figures 1, 2:
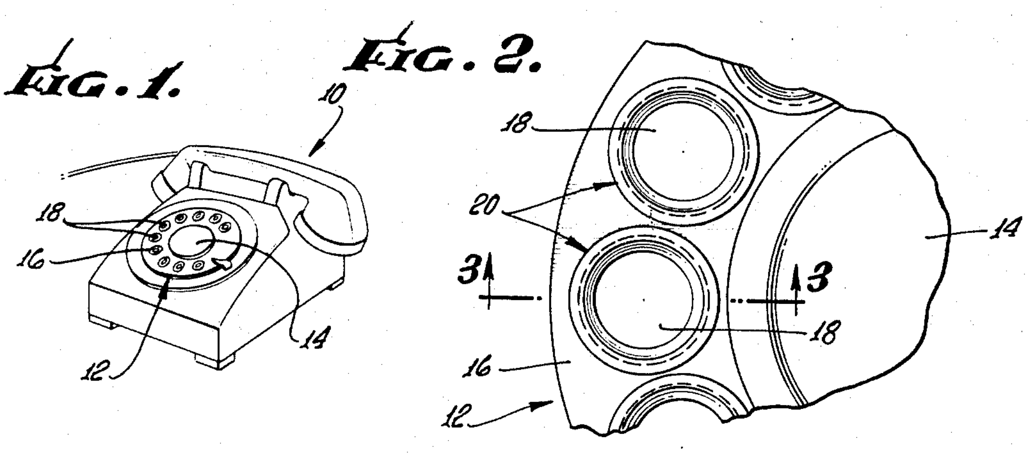
FIGURE 1 is a perspective view of a modern desk style dial telephone embodying dial insert rings according to the present invention.
FIGURE 2 is an enlarged, fragmentary plan view of a peripheral segment of the telephone dial shown in FIGURE 1.
Figure 3:
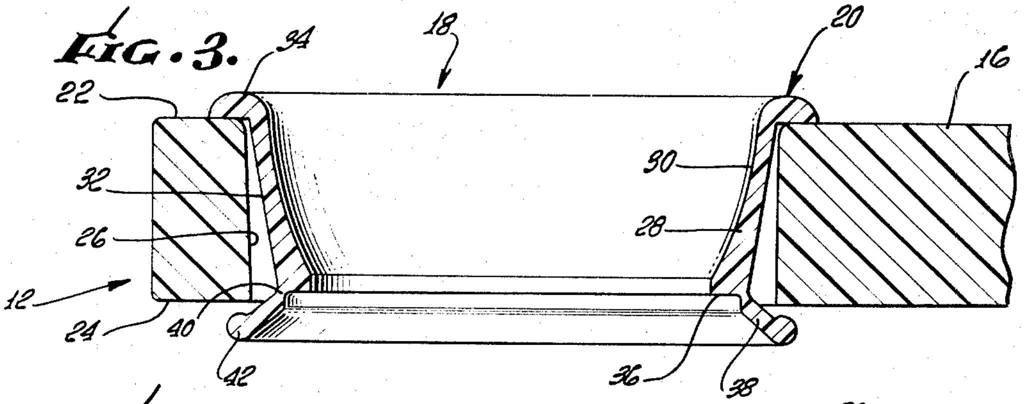
FIGURE 3 is a vertical section taken on the line 3—3 in FIGURE 2 but further enlarged, illustrating one of the dial insert rings disposed in its operative, rotatable position in a finger hole in the dial shown in FIGURES 1 and 2, this dial being a relatively thick one, and the dial insert ring being in its extended condition.

Referring to the drawings, and at first to FIGURES 1, 2 and 3 thereof, a modern desk type telephone 10 is illustrated in FIGURE 1, and includes a dial 12 that is rotatable thereon, the dial 12 being generally in the form of a wheel having a central hub portion 14 and a generally flat, annular rim portion 16. The rim portion 16 has ten finger holes 18 extending therethrough, and rotatably mounted within each of these finger holes 18 is a dial insert ring 20 according to the present invention.

Figure 4:
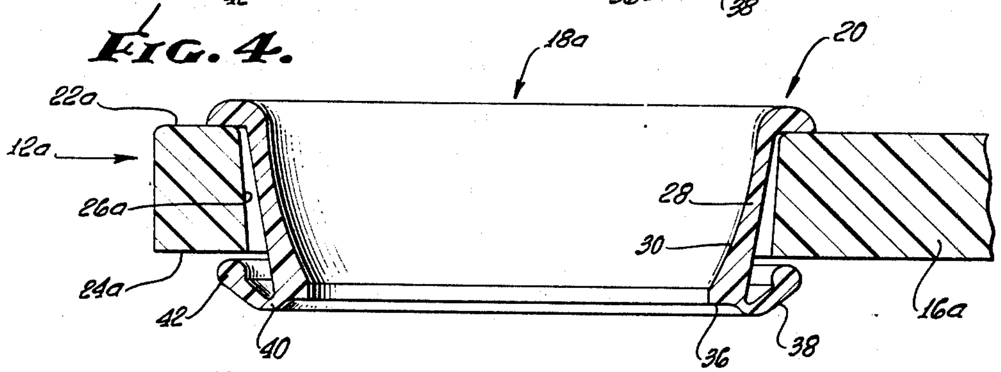
FIGURE 4 is a view similar to FIGURE 3, but with the dial insert ring operatively mounted on a relatively thin dial, and with the insert ring adjusted to its contracted condition for a proper rotational fit in the thinner dial.
Figure 5:
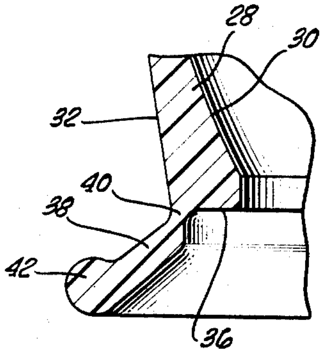
FIGURE 5 is a greatly enlarged, fragmentary vertical section showing a portion of the dial insert ring in its extended condition as in FIGURE 3, to illustrate the details of construction of the ring.

A large percentage of the dial telephones in use and in production today employ a plastic dial. However, such plastic dials are provided in several thicknesses which differ substantially. Thus, the telephone dial 12 which is illustrated in sectional detail in FIGURE 3 is a relatively thick plastic dial, while the dial 12*a* illustrated in FIGURE 4 is a relatively thin plastic dial. The considerable difference between the thickness of the dial 12 of FIGURE 3 and the dial 12*a* of FIGURE 4 typifies the difference in thickness between the several types of plastic dials currently in wide usage. This difference is so substantial that a dial insert of fixed dimensions which is sufficiently extended axially to fit the relatively thick dial 12 of FIGURE 3 will be entirely too large for satisfactory operation on the thinner dial 12*a* of FIGURE 4; while conversely a dial insert of fixed dimensions suitable for operation on the dial 12*a* cannot be rotatably engaged for operation in the dial 12.

Referring to FIGURE 3, the dial 12 has generally flat upper and lower surfaces 22 and 24, respectively. Each of the ten dial finger holes 18 is defined by a tapered annular surface 26 which extends between the dial surfaces 22 and 24.

Each dial insert ring 20 according to the present invention comprises a tapered tubular body 28 which has a rounded or cupped inner surface 30 providing a comfortable seat for the fingertip when dialing. The outer surface 32 of the insert ring body is preferably generally frusto-conical, with diameters that are smaller than the corresponding diameters of the tapered hole surface 26 along the entire axial extent of the tubular body 28 so as to provide a clearance between the body 28 and the surface 26 of the hole for freedom of rotation of the dial insert ring 20 in the hole.

The insert ring 20 is provided at its upper end with a radially outwardly directed annular bearing flange 34 which positions the insert 20 against downward movement through the finger hole 18 and permits relatively free rotation of the insert ring 20 within the finger hole 18.

The lower end 36 of the insert ring body 28 is relatively thick and generally rigid so as to provide a suitable support structure for an adjustable flange or lip 38 which is connected to the lower end 36 of the body by means of a thin annular web 40. The adjustable flange 38 is preferably generally frusto-conical in shape, and terminates at its free or outer edge in an annular bead 42.

The dial insert ring 20 is preferably molded as a unitary structure from a plastic material which is generally rigid, but which can be flexed without damage where the material is relatively thin. Examples of suitable plastic materials which are given by way of illustration only, and not of limitation, are nylon and polypropylene. With a material of these qualities, the thin annular web 40 which connects the adjustable flange 38 to the lower end 36 of the body provides an annular hinge about which the adjustable flange 38 may be pivoted. By providing the generally thick lower end portion 36 of the body, the adjustable flange 38 as a member which is substantially thinner than the lower end of the body, the annular web 40 which is considerably thinner than both the flange 38 and the lower end portion of the body, and the annular bead 42 which is substantially thicker than the flange 38, the result is that the adjustable flange or lip 38 can be snapped in an overcenter action between two relatively fixed and stable positions. One of the positions is the extended position illustrated in FIGURE 3, wherein the flange 38 flares downwardly and outwardly from the hinge web 40, and the other position is illustrated in FIGURE 4, wherein the flange 38 slants upwardly and outwardly from the hinge web 40. As the flange 38 is moved from its downward position of FIGURE 3 to its upward position of FIGURE 4, its periphery or free edge portion is circumferentially stretched as it moves through the overcenter position, and at the same time the inner part of the flange 38 tends to be forced radially inwardly and circumferentially compacted. These stresses during the overcenter movement account for the snap action between the downwardly directed or extended position of FIGURE 3 and the upwardly directed or contracted position of FIGURE 4. The positions of FIGURES 3 and 4 are both positions of substantial repose of the material in the flange or lip 38. The annular bead 42 is helpful in the overcenter action by providing an increased cross-sectional area, and hence an increase in strength, at the free edge of the adjustable flange 38, and thereby strengthening the overcenter snap action.

The dial **12*a* illustrated in FIGURE 4 is generally similar to the dial 12 of FIGURE 3, having a rim portion 16*a* with ten finger holes 18*a* therethrough. The only important difference between the dial 12 and the dial 12*a* insofar as the present invention is concerned is the fact that the upper and lower surfaces 22*a* and 24*a*, respectively, of the dial 12*a* are disposed considerably closer together than the corresponding surfaces 22 and 24 of the dial 12, making the dial 12*a* substantially thinner than the dial 12. The annular surface 26*a* that defines the finger hole 18*a* has generally the same diameter as the upper portion of the annular hole surface 26 in the dial 12, whereby the upper portion of the dial insert ring 20 of the present invention will rotatably fit within the finger hole 18*a*, with the upper flange 34 providing an annular bearing for free rotation against the upper surface 22*a* of the dial 12*a*. By flipping the adjustable lower flange or lip 38 upwardly to its contracted position the annular bead 42 will be brought relatively close to the lower dial surface 24*a*, but with sufficient clearance for freedom of rotation. If the adjustable flange or lip 38 were left in its extended position of FIGURE 3 when the insert ring 20 was engaged in the finger hole 18*a* of the thin dial 12*a*, the spacing between the annular bead 42 and lower surface 24*a* of the dial would be so great that the rotatable fit of the insert ring 20 would be entirely too sloppy for satisfactory usage, and in many telephones the flange or lip 38 would extend downwardly so far as to rub against the fixed surface of the telephone underneath the rotatable dial 12*a***, thereby defeating the purpose of the insert ring in reducing dialing friction.

The annular bead 42 not only adds strength to the free, peripheral edge of the adjustable flange 38, but it also provides shoulder means that is engageable in substantially a line contact with the lower surface 24 of the dial 12 when the flange or lip 38 is in its extended position as in FIGURE 3, and also with the lower surface **24*a* of the dial 12*a* when the flange or lip 38 is in its retracted position as in FIGURE 4. The rounded cross-section of the bead 42 permits such line contact despite the substantial change in angular position of the adjustable flange or lip 38, and thereby further assists in assuring freedom of rotational movement of the dial insert ring 20 in the finger hole of either the relatively thick dial 12 or the relatively thin dial 12*a***.

Dial insert rings 20 can be easily snapped into their operative positions as illustrated in FIGURES 3 and 4. When the insert rings 20 are to be engaged in the finger holes of a relatively thick telephone dial 12, the adjustable lower flange 38 is in its extended position prior to insertion of each ring 20 in its respective finger hole. The upwardly flaring taper of each finger hole 18 assists insertion of the ring 20 therein the lower flange or lip 38 being inserted into the upper end of the hole 18 and as the ring 20 is pushed downwardly, the taper in the hole 18 will cam the adjustable flange or lip 38 radially inwardly until the flange or lip moves past the lower end of the hole 18, at which time the flange or lip 38 will pop radially outwardly to the seated position shown in FIGURE 3. The rounded cross-section of the annular bead 42 assists the smooth camming action as the insert ring 20 is being pushed through the hole 18.

Similarly, when the dial insert ring 20 is engaged in one of the finger holes **18*a* of the dial 12*a*, the lower flange or lip 38 is snapped up to its constricted position as shown in FIGURE 4, and the insert ring 20 is merely pushed downwardly into its operative position. The upwardly directed frusto-conical configuration of the adjustable flange or lip 38 assists in camming the flange or lip 38 radially inwardly as it moves downwardly through the hole 26*a***.

While the instant invention has been shown and described herein in what is at the present time believed to be the most practical and preferred embodiment, it is recognized that departures may be made therefrom within the scope of the invention which is therefore not to be limited to the details disclosed herein but is to be accorded the full scope of the claims.

I claim:

1. A telephone dial insert ring which comprises a tubular body adapted for rotatable mounting within a finger hole of a telephone dial, an upper annular flange extending radially outwardly from said body proximate the upper end thereof and adapted to overlap the upper surface of the dial, and a lower annular flange extending radially outwardly from said body proximate the lower end thereof and adapted to extend under the lower surface of the dial, one of said flanges being axially adjustable on said body to adjust the spacing between the flanges and thereby adapt the ring for rotatable mounting in telephone dials of different thicknesses.

2. A telephone dial insert ring as defined in claim 1, wherein said adjustable flange is the lower flange.

3. A telephone dial insert ring as defined in claim 1, wherein said adjustable flange is flexibly connected to said body at a generally annular connection and inclines axially and radially outwardly from the plane of the connection, said adjustable flange having two discrete positions of repose, an extended position wherein it inclines away from the other flange for relatively wide spacing between the flanges, and a retracted position wherein it inclines toward the other flange for relatively close spacing between the flanges.

4. A telephone dial insert ring as defined in claim 3, wherein said adjustable flange is generally frusto-conical.

5. A telephone dial insert ring as defined in claim 3, wherein said adjustable flange terminates at its outer edge in a generally outwardly and upwardly directed annular bead.

6. A telephone dial insert ring as defined in claim 3, wherein said connection comprises a thin annular web of material integrally joining the adjustable flange to the body.

7. A telephone dial insert ring as defined in claim 6, wherein said annular web is substantially thinner than the portions of the body and adjustable flange immediately adjacent thereto.

8. A telephone dial insert ring as defined in claim 7, wherein the portion of said body immediately adjacent to said annular web is substantially thicker than the portion of said adjustable flange immediately adjacent to said annular web.

9. A telephone dial insert ring as defined in claim 8, wherein said adjustable flange is the lower flange and wherein said tubular body tapers from a relatively large diameter at its upper end to a relatively small diameter at its lower end.

10. A telephone dial insert ring as defined in claim 9, wherein said body has a concave annular inner surface providing a cupped inner configuration of the body for comfortably receiving a fingertip inserted into the body through its upper end.

No references cited.

KATHLEEN H. CLAFFY, *Primary Examiner.*

A. H. GESS, *Assistant Examiner.*